United States Patent [19]

Hasegawa et al.

[11] Patent Number: 5,267,095

[45] Date of Patent: Nov. 30, 1993

[54] DIGITAL RECONSTRUCTING OF HARMONICS TO EXTEND BAND OF FREQUENCY RESPONSE

[75] Inventors: Tsunao Hasegawa; Masahiro Sui; Tomoyasu Yamada, all of Tokorozawa, Japan

[73] Assignee: Pioneer Electronic Corporation, Tokyo, Japan

[21] Appl. No.: 781,372

[22] Filed: Oct. 23, 1991

[30] Foreign Application Priority Data

Jan. 31, 1991 [JP] Japan .................................. 3-011089

[51] Int. Cl.$^5$ .......................................... G11B 20/10
[52] U.S. Cl. ........................... 360/39; 369/124; 84/660
[58] Field of Search ............... 84/603, DIG. 9, 660, 84/661, 622, 625; 360/32, 39; 369/59, 124; 381/98, 61; 328/16, 23; 363/4

[56] References Cited

U.S. PATENT DOCUMENTS

| 4,700,390 | 10/1987 | Machida | 84/660 X |
| 4,750,180 | 6/1982 | Doyle | 360/53 X |
| 4,853,797 | 8/1989 | Yamada et al. | 360/32 |

FOREIGN PATENT DOCUMENTS 2-311006 12/1990 Japan .

OTHER PUBLICATIONS

Lathi "Modern Digital and Analog Communications Systems" 2nd ed. 1989 pp. 81-82.
J. R. Watkinson, "Compact Disc Players-2", Electronics and Wireless World, vol. 91, No. 1597, Nov. 1985, pp. 23-33.
"Chips for Digital Audio", 2420 Elector, vol. 9, No. 1, Jan. (1983), pp. 1-36 ∝ 1-42.
Proceedings of the ICCE 85, vol. III, No. 3.3, Jun. 5, 1985, pp. 46-47, D. Guedhart et al. "Lowpass Filter and Output Circuits for . . . ".
Immink et al., "Digital Audio Modulation . . . ", Journal of the Engineering Society, vol. 32, No. 11, Nov. 1984, pp. 883-888.

Primary Examiner—Aristotelis Psitos
Assistant Examiner—James T. Wilson
Attorney, Agent, or Firm—Keck, Mahin & Cate

[57] ABSTRACT

A PCM digital audio signal playback apparatus is provided for extracting from the digital audio signal read out from a recording medium an original signal component ranging lower than ½ of its sampling frequency fs, producing a harmonic from the original signal component, extracting a harmonic component ranging higher than fs/2 from the harmonic, and adding the harmonic component to the original signal component. Accordingly, a high-frequency carrying signal, e.g. an impulse, is processed without causing ringings in the waveform response.

6 Claims, 9 Drawing Sheets

DIGITAL RECONSTRUCTING OF HARMONICS TO EXTEND BAND OF FREQUENCY RESPONSE

BACKGROUND OF INVENTION

1. Field of the Invention

The present invention relates to a PCM digital audio signal playback apparatus for reproducing PCM (pulse code modulation) digital audio signals recorded in a recording medium, e.g. a compact disk.

2. Description of the Related Art

The recording frequencies of a digital audio signal to be recorded onto a recording medium, e.g. a compact disk (CD) or a digital audio tape (DAT), are limited by the sampling theorem to stay lower than a half the sampling frequency for avoiding any folding distortion.

In common, human ears can perceive up to 20 KHz of a single tone (pure sound) and thus, the sampling frequency is 44.1 KHz for CD recording and 48 KHz for DAT recording.

It is now acknowledged through various problems that elimination of a high-frequency component from an audio signal with a filter having a filtering characteristic of acutely blocking frequencies higher than 20 KHz, causes unfavorable results in a reproduced sound and also, a ringing effect in the waveform response to a high-frequency signal such as an impulse will deteriorate the reproductivity of waveforms.

A method for improving the reproductivity of waveforms has been developed in which a short-interval succession of sampling points with time is produced using a Lagrangian or spline function interpolation technique. As the result, CD players or other playback apparatuses which can reproduce a high-frequency signal component higher than 20 KHz, are now commercially available.

Strictly speaking, a high-frequency component reproduced by such a prior art player is rather a folding signal of the fundamental wave than an actual higher-than-20KHz component which is limited by a filter during recording.

SUMMARY OF THE INVENTION

It is thus an object of the present invention to provide a PCM digital audio signal playback apparatus capable of reproducing natural sounds which are hardly obtained through elimination of a high-frequency component with a common high-cut filter and providing a waveform response to a high-frequency carrying signal, e.g. an impulse, without causing unwanted ringing effects.

A PCM digital audio signal playback apparatus according to the present invention is intended for reproduction of a PCM digital audio signal read out from a recording medium and comprises: a first oversampling digital lowpass filter for eliminating from the PCM digital audio signal a frequency range higher than about ½ of its sampling frequency fs, multiplying it to n times the sampling frequency (n is an integer not less than 2), and interpolating resultant extra sampling points for oversampling; digital multiplier means for producing a harmonic from the original signal which is an output audio signal of the first lowpass filter; a digital highpass filter for eliminating a frequency range lower than about ½ the sampling frequency fs from the output signal of the digital multiplier means; and adder means for summing the output signal of the first lowpass filter and the output signal of the highpass filter.

Another PCM digital audio signal playback apparatus according to the present invention is provided for reproduction of an analog audio signal converted from its PCM digital form directly read out from a recording medium, comprising: a lowpass filter for eliminating from the analog audio signal a frequency range higher than about ½ the sampling frequency fs of the PCM digital audio signal; multiplier means for producing a harmonic from the original signal which is an output audio signal of the lowpass filter; a highpass filter for eliminating a frequency range lower than about ½ the sampling frequency fs from the output signal of the multiplier means; and adder means for summing the output signal of the lowpass filter and the output signal of the highpass filter.

In action, the PCM digital audio signal playback apparatus of the present invention performs extracting from the digital audio signal read out from a recording medium an original signal component ranging lower than ½ of its sampling frequency fs, producing a harmonic from the original signal component, extracting a harmonic component ranging higher than fs/2 fs from the harmonic, and adding the harmonic component onto the original signal component. As the result, high-order harmonics can be produced from the original signal component without influencing a particular frequency range of the PCM digital audio signal lower than ½ the sampling frequency fs.

DETAILED DESCRIPTION OF THE PREFERRED EMBODIMENTS

Preferred embodiments of the present invention will be described referring to the accompanying drawings.

Figure 1:
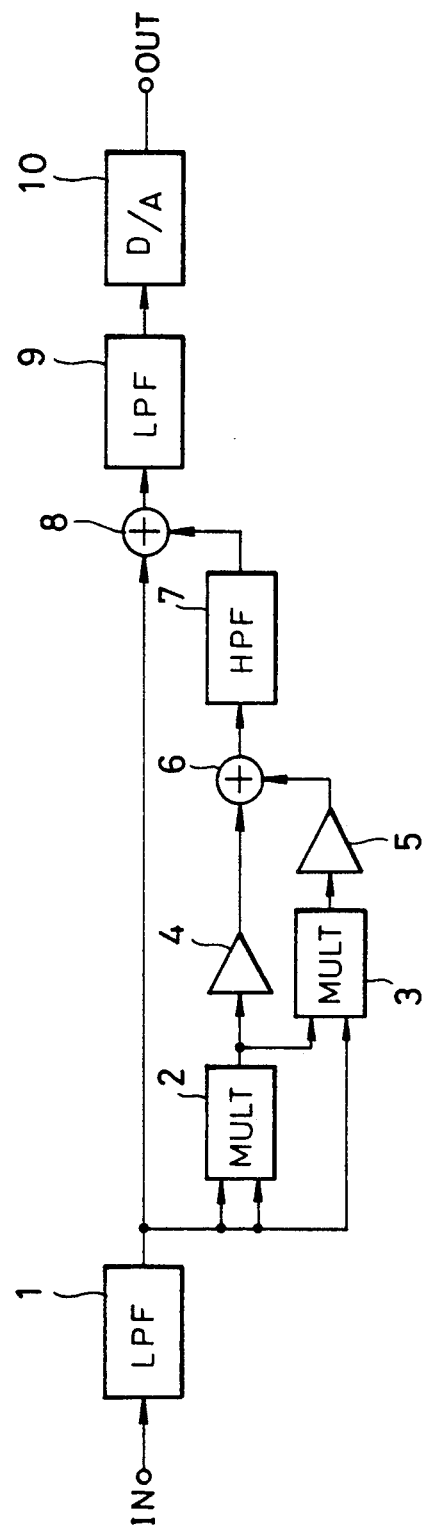
FIG. 1 is a block diagram of a playback apparatus showing one preferred embodiment of the present invention.
Figure 2:
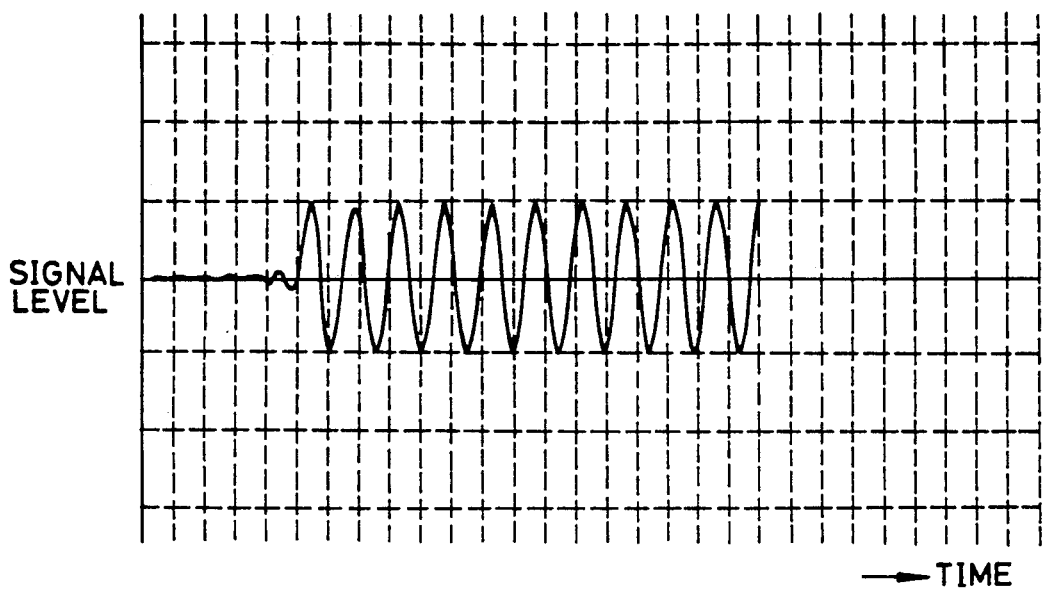
FIG. 2 is a waveform diagram showing an output of a first LPF of the apparatus illustrated in FIG. 1.
Figure 3:
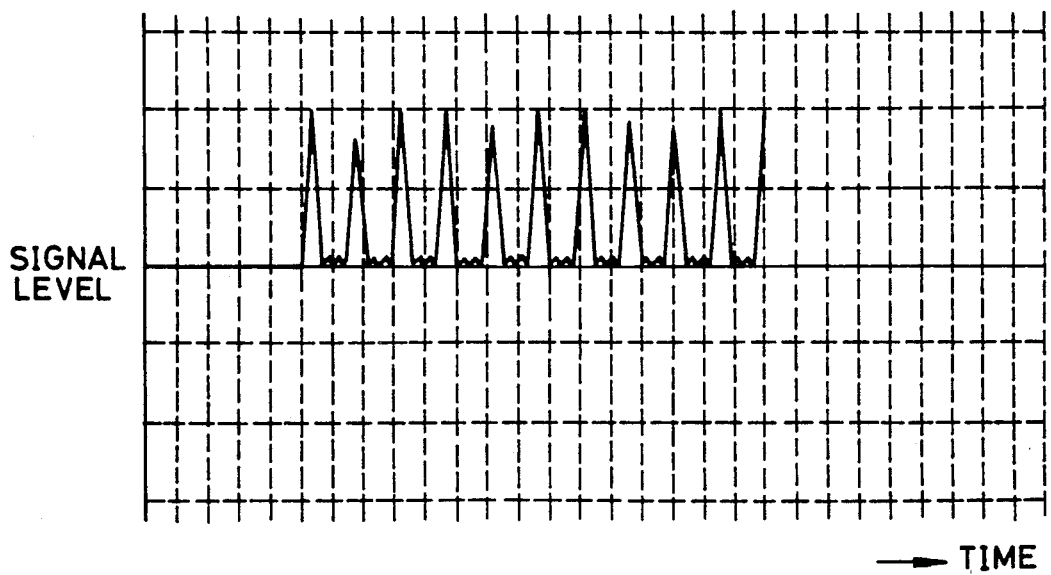
FIG. 3 is a waveform diagram showing an output of an first adder of the apparatus illustrated in FIG. 1.

FIG. 1 illustrates a PCM digital audio signal playback apparatus in which a PCM digital audio signal read out from a recording medium, e.g. a compact disk, is supplied to an input terminal IN. In compact disk recording, a digital audio signal is read out from a compact disk with a pickup (not shown), EFM (eight to fourteen modulation) demodulated, and error corrected prior to delivery to the terminal IN. The input terminal IN is coupled to a first lowpass filter (LPF) 1 which is a common 4×oversampling digital filter used in a CD player and having a filtering characteristic of acutely blocking frequencies higher than ½ the sampling frequency fs. The output terminal of the LPF 1 is coupled to two multipliers 2 and 3. The first multiplier 2 is arranged for a second power of an output value of the LPF 1 and the second multiplier 3 is adapted for having a product of the output value of the LPF 1 and the output value of the first multiplier 2. The multiplier is coupled at output to a first coefficient multiplier 4. The second multiplier 3 is coupled at output to a second coefficient multiplier 5. Both the first and second coefficient multipliers 4, 5 for multiplication by coefficients K1 and K2 respectively are coupled at output to a first adder 6 for addition of two output values of their respective coefficient multipliers 4 and 5. The adder 6 is in turn coupled to a digital highpass filter (HPF) 7 for eliminating a frequency range lower than 2fs. The HPF 7 is coupled to an adder 8 to which the output of the first LPF 1 is also coupled. The adder 8 is coupled at output to a second LPF 9 which is an FIR type oversampling digital filter for eliminating a frequency range higher than 3fs/2 and increasing a sampling rate from 4fs to 8fs. The LPF 9 is in turn coupled to a D/A converter 10 where a digital audio signal from the LP 9 is converted into an analog form of a frequency of 8fs, eight times the sampling frequency fs of the input digital signal. An output signal of the D/A converter 10 is transferred to an output terminal OUT.

In action, a PCM digital audio signal of the sampling frequency fs read out from the recording medium is fed to the first LPF 1 where it is multiplied to 4fs, four times the original sampling rate fs and its frequency component higher than fs/2 fs is eliminated. When the sampling frequency is increased to 4fs, a harmonic component ranging from fs/2 to 2fs can be generated. The digital audio signal of the sampling frequency 4fs is supplied from the LPF 1 to the first multiplier 2 where a second harmonic is produced and fed to the second multiplier 3 for producing a third harmonic.

When the input signal from the LPF 1 to the multipliers 2 and 3 is cosωt, the output value of the first multiplier 2 is obtained from the following.

$$\cos\omega t \cdot \cos\omega t = (1 + \cos 2\omega t)\tfrac{1}{2}$$

Also, the output value of the second multiplier 3 is obtained from the following.

$$\cos\omega t \cdot \cos\omega t \cdot \cos\omega t = \{(3\cos\omega t) + (\cos 3\omega t)\}/4$$

As the second and third harmonics are produced in the above manner, four and more harmonics will be generated by the same multiplication.

The two digital signals containing harmonics are transferred from the multipliers 2 and 3 to the coefficient multipliers 4 and 5 respectively where the are level adjusted and then, fed to the adder 6 for summing up. The output signal from the adder 6 contains other components than a second and a third harmonic which have to be removed for extracting the second and third harmonics. The PCM digital audio signal directly from the recording medium also contains harmonics in a frequency range lower than fs/2. Hence, the summing of the two signals from the LPF 1 and the adder 6 involves overlap. For preventing it, the output signal of the adder 6 is filtered by the HPF 7 for eliminating a frequency range lower than fs/2. This also causes cutoff of second and third harmonic components carried in a frequency range not higher than fs/2, which will be described in more detail later.

The output signal of the HPF 7 is then fed to the adder 8 where it is summed with the output signal of the LPF 1. More specifically, the harmonic from the HPF 7 is added to the signal generated from the LPF 1. The two coefficient multipliers 4 and 5 are provided for controlling the ratio between an original component and a harmonic component for the summation. The ratio is determined by the coefficients K1 and K2 of their respective coefficient multipliers 4 and 5 which may be calculated from data of reproduced sounds or preset to desired values using key controls for having optimum sounds depending on a music source.

The output signal of the adder 8 is then fed to the second LPF 9 where its frequency range higher than 3fs/2 is eliminated because the maximum of the second and third harmonics in the frequency range lower than fs/2 is equal to 3fs/2. The digital signal of the doubled sampling rate 8fs from the LPF 9 is then fed to the D/A converter 10 for conversion to an analog audio signal. Accordingly, the analog audio signal contains a second and a third harmonics which are absent in the original digital audio signal directly transferred from the recording medium.

Figure 4:
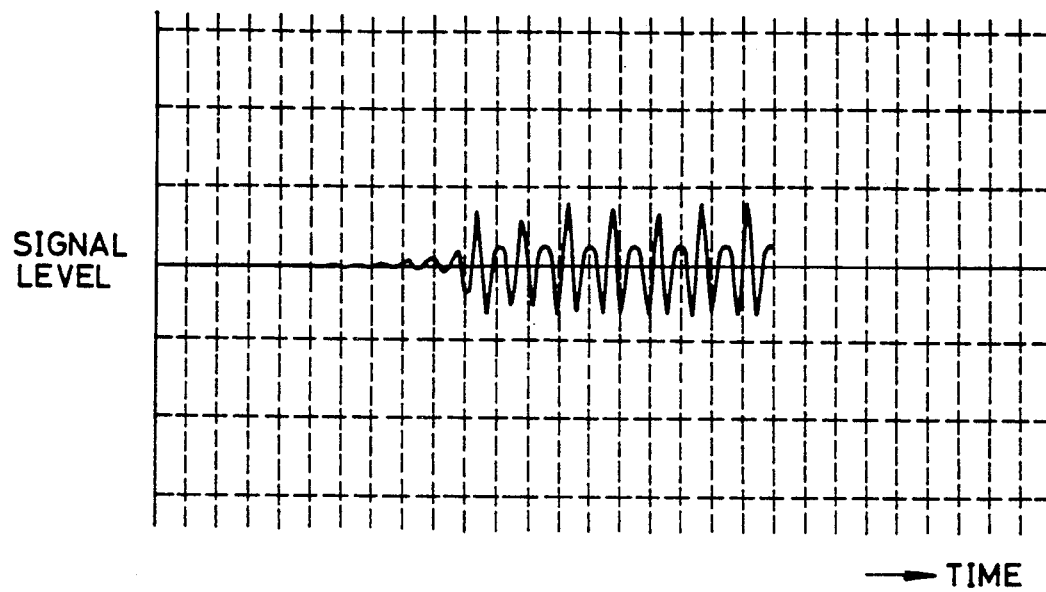
FIG. 4 is a waveform diagram showing an output of an HPF of the apparatus illustrated in FIG. 1.
Figure 5:
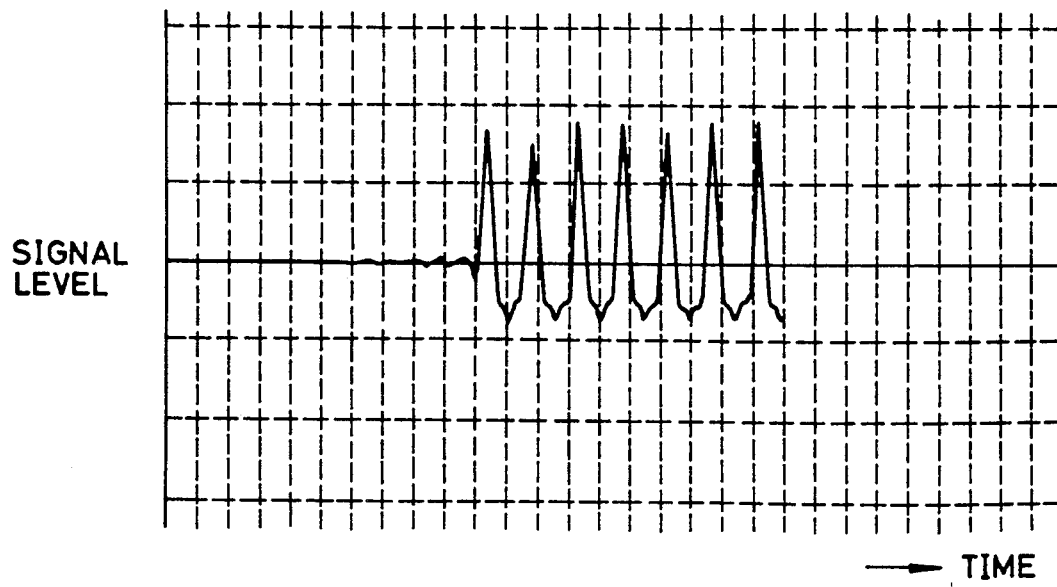
FIG. 5 is a waveform diagram showing an output of a second adder of the apparatus illustrated in FIG. 1.
Figure 6:
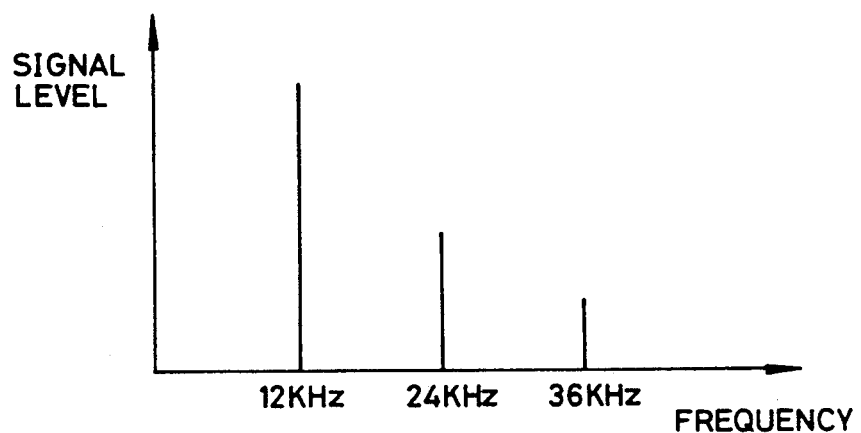
FIG. 6 is a diagram showing the frequency spectrum of a signal produced from an original 12 KHz signal with the apparatus illustrated in FIG. 1.

The audio signal characteristics of a digital signal produced by each of the foregoing components of the PCM digital audio signal playback apparatus of the present invention will now be explained referring to FIGS. 2 to 8. If the PCM digital audio signal read out from the recording medium is a sine wave of 12 KHz, the output signal of the first LPF 1 produces a waveform shown in FIG. 2 which represents a sampling rate of 4 times and for ease of understanding, is expressed in the analog form where the sampling points are joined to one another by the real lines. After the output signal of the LPF 1 is transmitted through the two multipliers 2 and 3, where a second (24 KHz) and a third harmonic (36 KHz) are generated, to the coefficient multipliers 4 and 5 where K1 and K2 are equivalent to 1, it is fed to the adder 6 which then delivers a waveform shown in FIG. 3. The output signal of the adder 6 also contains unwanted components, e.g. a DC components and a 12-KHz fundamental wave, as well as the second and third harmonics. After the unwanted components are removed by the HPF 7, the waveform becomes as shown in FIG. 4. The remaining second (24 KHz) and third (36 KHz) components are then summed by the adder 8 with the original signal to a sum signal of which waveform is shown in FIG. 5. The frequency spectrum of the sum signal is as shown in FIG. 6.

Figure 7:
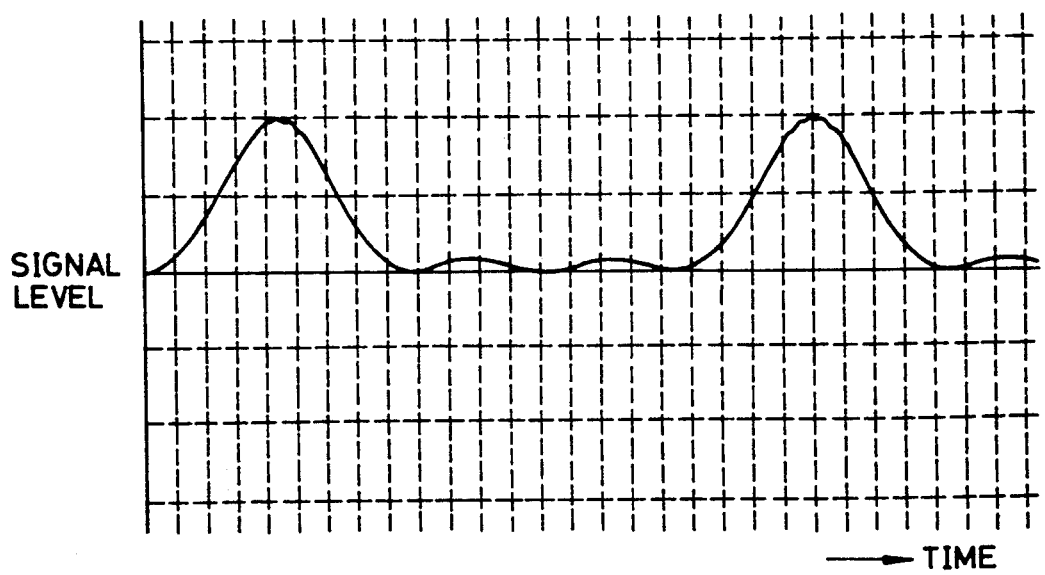
FIG. 7 is a waveform diagram showing another output of the first adder of the apparatus illustrated in FIG. 1.
Figure 8:
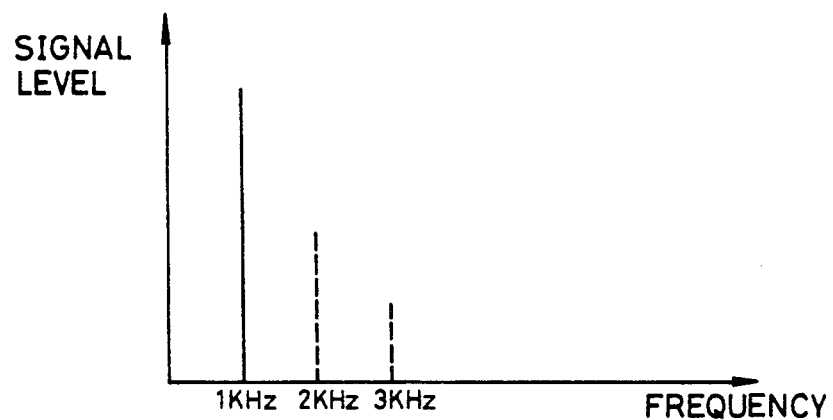
FIG. 8 is a diagram showing the frequency spectrum of a signal produced from an original 1 KHz signal with the apparatus illustrated in FIG. 1.

If the PCM digital audio signal is a sine wave of 1 KHz, the output signal of the adder 6 has a waveform shown in FIG. 7. Although the output signal of the adder 6 contains a DC component, a 1-KHz fundamental wave, a second harmonic (2 KHz), and a third harmonic (3 KHz), they all are cleared off by the HPF 7. Hence, the audio signal output of the D/A converter 10 contains no components but a 1-KHz component. It would be understood that since the original input signal (1 KHz) contains harmonics, no more addition of 2 KHz and 3 KHz components is needed. FIG. 8 illustrates the frequency spectrum of an output signal of the adder 8 in which a second (2 KHz) and a third component (3 KHz) denoted by the broken lines are absent as eliminated from the original 1 KHz signal.

Figure 9:
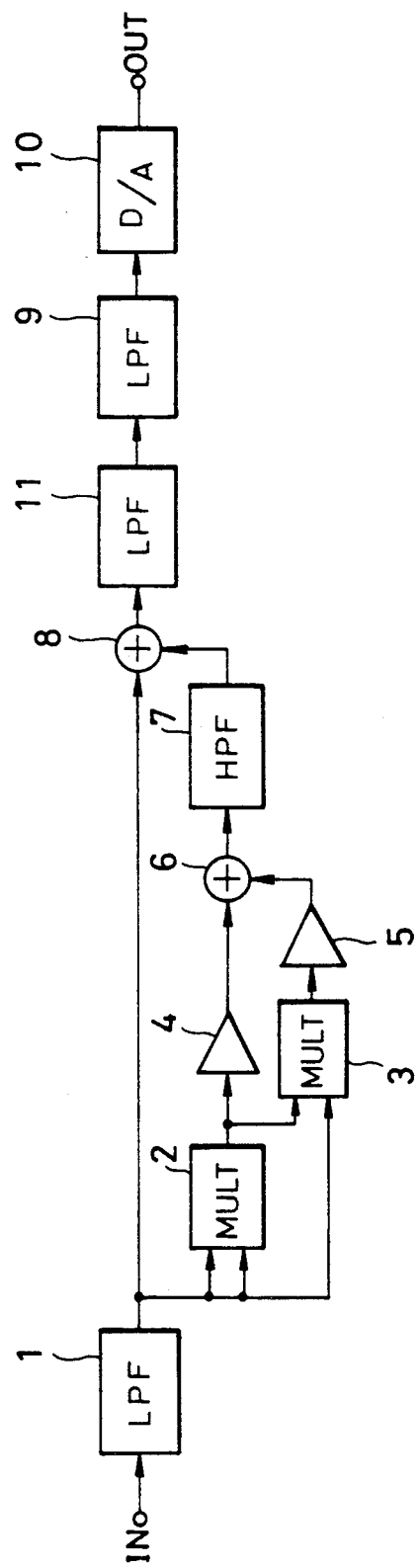
FIG. 9 is a block diagram of a playback apparatus showing another embodiment of the present invention.
Figure 10:
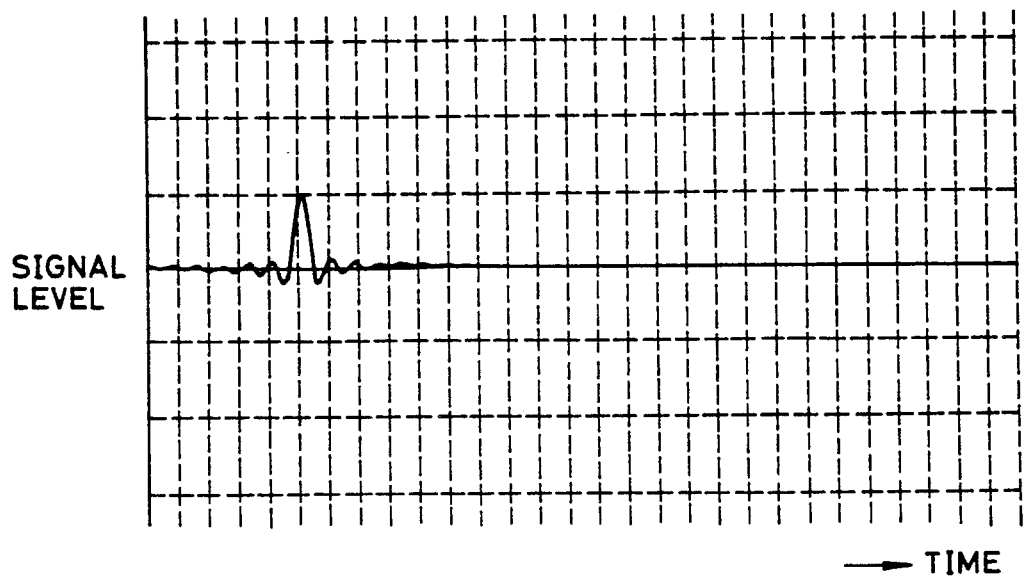
FIG. 10 is a waveform diagram showing the impulse response of a first LPF of the apparatus illustrated in FIG. 9.
Figure 11:
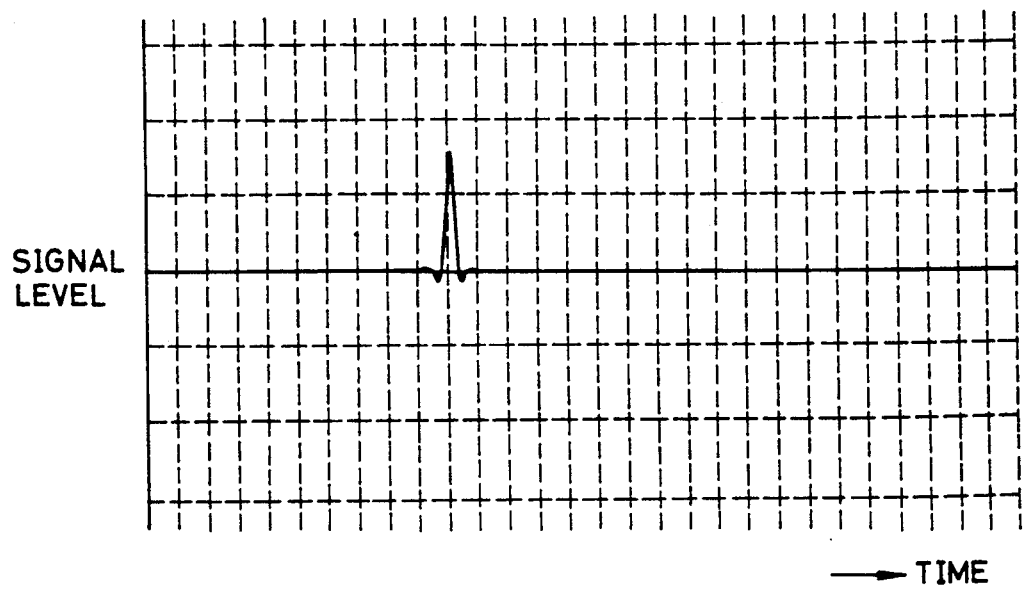
FIG. 11 is a waveform diagram showing the impulse response of an first adder of the apparatus illustrated in FIG. 9.
Figure 12:
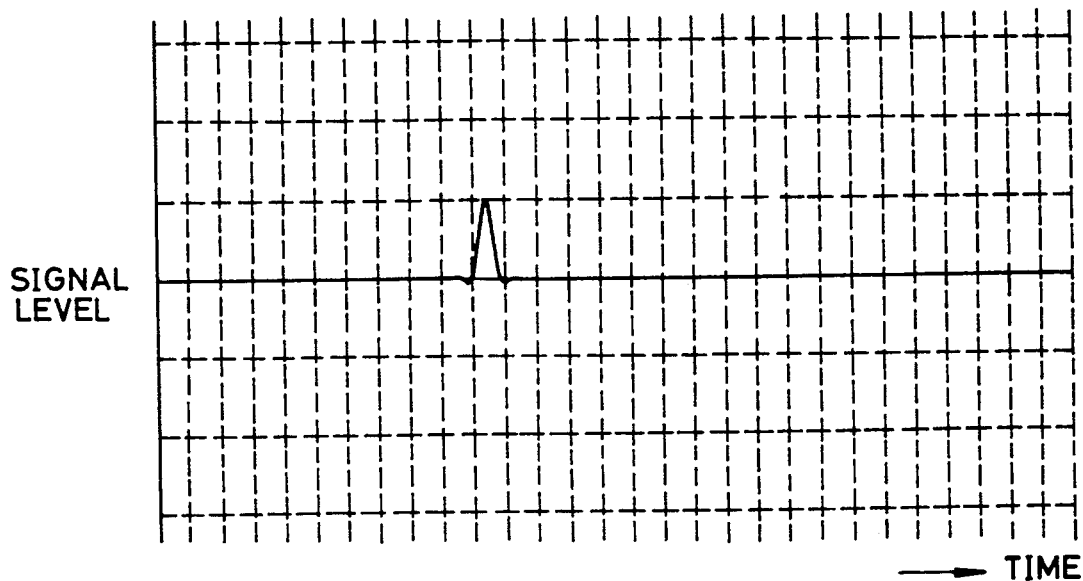
FIG. 12 is a waveform diagram showing the impulse response of a third LPF of the apparatus illustrated in FIG. 9.

FIG. 9 shows another embodiment of the present invention in which like numerals represent like components as those in FIG. 1. The second embodiment is similar to the first embodiment, except that a third LPF 11 is interposed between the adder 8 and the second LPF 9. The LPF 11 is a low-degree lowpass filter which has a cutoff frequency of fs/2 for attenuating the frequency range lower than fs/2 at a moderate gradation about fs/2. As the level balance between the original signal and the harmonics is controlled by the two multipliers 4 and 5, the reproductivity of waveforms is enhanced and thus, the quality of a reproduced sound will be high so that the harmonics are not emphasized. This is proven in the form of an impulse response signal, as explained in FIGS. 10 to 12. FIG. 10 shows an impulse response characteristic in the output signal of the LPF 1 in which a ringing results from an acute limitation for cutoff frequencies. On the other hand, the impulse response in the output signal of the adder 8 is shown in FIG. 11, the ringing is decreased by means of adding harmonics. As the output signal is further filtered by the third LPF 11 of moderate cutoff characteristic, its impulse response waveform will display least ringing effects, as shown in FIG. 12.

Figure 13:
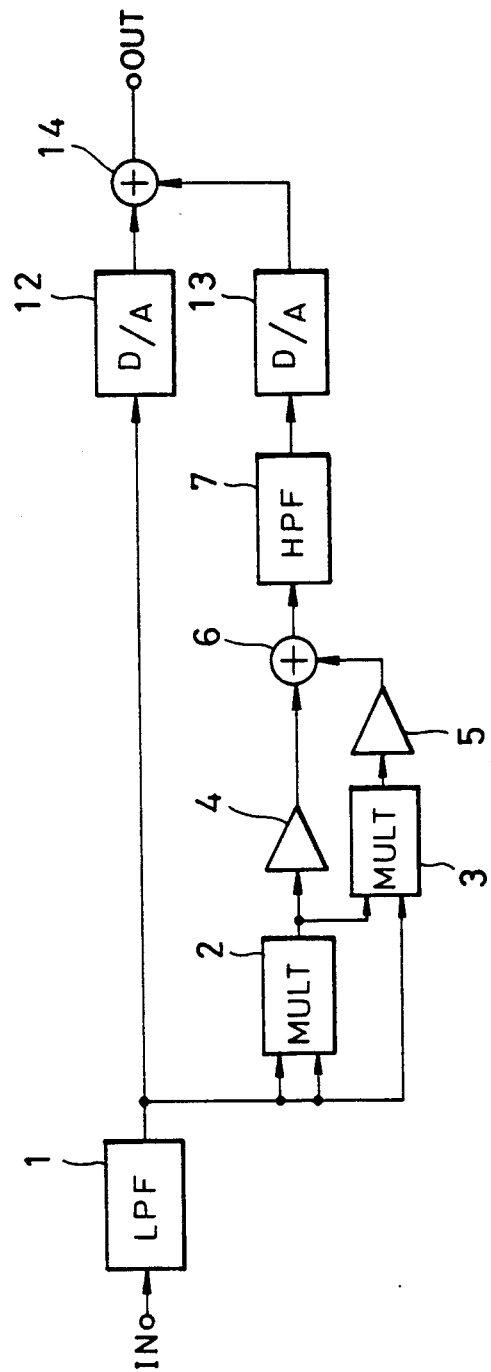
FIG. 13 is a block diagram of a playback apparatus showing a further embodiment of the present invention.

FIG. 13 illustrates a further embodiment of the present invention, in which like numerals represent like components as those shown in FIG. 1. The third embodiment is arranged in which the output signals of the LPF 1 and the HPF 7 are fed to a D/A converter 12 and a LPF 1 and the HPF 7 are fed to a D/A converter 12 and a D/A converter 13 respectively. Two analog signals from their respective D/A converters 12 and 13 are summed up by an adder 14. More particularly, the original signal and the harmonics are converted with the two D/A converters to their respective analog forms which are then summed up. Advantageously, the third embodiment makes use of the circuit arrangement of a known procedure for processing the original signal. Also, the harmonics can be level controlled while being in the analog form.

In each embodiment, the LPF 9 for eliminating a frequency range higher than 3fs/2 may be an analog filter while its analog input signal has been converted by a D/A converter from the digital form. Also, the sampling rate may be increased further to 8 times, 16 times, and so on for no use of such analog filters.

Although the PCM digital audio signal playback apparatus has at least one D/A converter in each embodiment, the D/A converter will separately be mounted outside the apparatus.

Although the digital audio signal read out from a recording medium is digital-to-analog converted after processed in the digital form, except that shown in FIG. 13, it may be first converted to its analog form which is then processed by the same manner as shown in FIG. 1.

It is understood that a measure is needed for preventing overflow or underflow during the arithmetic operations for multiplication and addition. Also, each D/A converter has to be prepared with multiplication by a coefficient for creating no clipping.

As set forth above, the PCM digital audio signal playback apparatus carries out extracting from the PCM digital audio signal read out from a recording medium an original signal component ranging lower than ½ the sampling frequency of the PCM digital audio signal, producing a harmonic from the original signal component, extracting a harmonic component higher than fs/2 from the harmonic, and adding it to the original signal component. As the result, high-order harmonics can be produced from the original signal component without influencing a particular frequency range of the PCM digital audio signal lower than ½ the sampling frequency fs. Hence, signals which have been cut off during recording by a filter having an acute cutoff characteristic will be reproduced thus playing back a natural sound. Also, a high-frequency carrying signal, e.g. an impulse, will be processed without causing ringing effects in the waveform response.

What is claimed is:

1. A PCM digital audio signal playback apparatus for reproduction of a PCM digital audio signal read out from a recording medium, comprising:
    a first oversampling digital lowpass filter for eliminating from said PCM digital audio signal a frequency rang higher than about ½ of its sampling frequency fs, multi-plying it to n times said sampling frequency (n is an integer not less than 2), and interpolating resultant extra sampling points for oversampling;
    digital multiplier means for producing a harmonic from the original signal which is an output audio signal of said first lowpass filter;
    a digital highpass filter for eliminating a frequency range lower than about ½ said sampling frequency fs from the output signal of said digital multiplier means; and
    adder means for summing the output signal of said first lowpass filter and the output signal of said highpass filter.

2. A PCM digital audio signal playback apparatus according to claim 1, further comprising:
    a second oversampling digital lowpass filter for eliminating from the output audio signal of said adder means a frequency range higher than about n/2 of said sampling frequency fs, multiplying it to n×m times said sampling frequency (m is an integer not less than 2), and interpolating resultant extra sampling points for oversampling; and
    a D/A converter for converting a digital output signal of said second oversampling digital lowpass filter into its analog form.

3. A PCM digital audio signal playback apparatus according to claim 1, wherein said adder means comprises a first D/A converter for converting a digital output signal of said first oversampling digital lowpass filter into its analog form, a second D/A converter for converting a digital output signal of said highpass filter into its analog form, and an analog adder for summing two analog output signals form their respective first and second D/A converters.

4. A PCM digital audio signal playback apparatus according to claim 1, said multiplier means has a coefficient multiplier for level control of the harmonic produced.

5. A PCM digital audio signal playback apparatus according to claim 2, further comprising a lowpass filter interposed between the output of said adder means and the input of said second oversampling digital lowpass filter and having a moderate cutoff characteristic.

6. A PCM digital audio signal playback apparatus for reproduction of an analog audio signal converted from a PCM digital audio signal directly read out from a recording medium, comprising:

a lowpass filter for eliminating from the PCM digital audio signal a frequency range higher than about ½ the sampling frequency fs of said PCM digital audio signal multiplier means for producing a harmonic from an original signal which is the output audio signal of said lowpass filter;

a highpass filter for eliminating a frequency range lower than about ½ said sampling frequency fs from the output signal of said multiplier means; and adder means for summing the output audio signal of said lowpass filter and the output signal of said highpass filter.

* * * * *